April 29, 1941. K. G. SODERBERG 2,239,904
TUMBLING MACHINE
Filed March 23, 1940 2 Sheets-Sheet 1
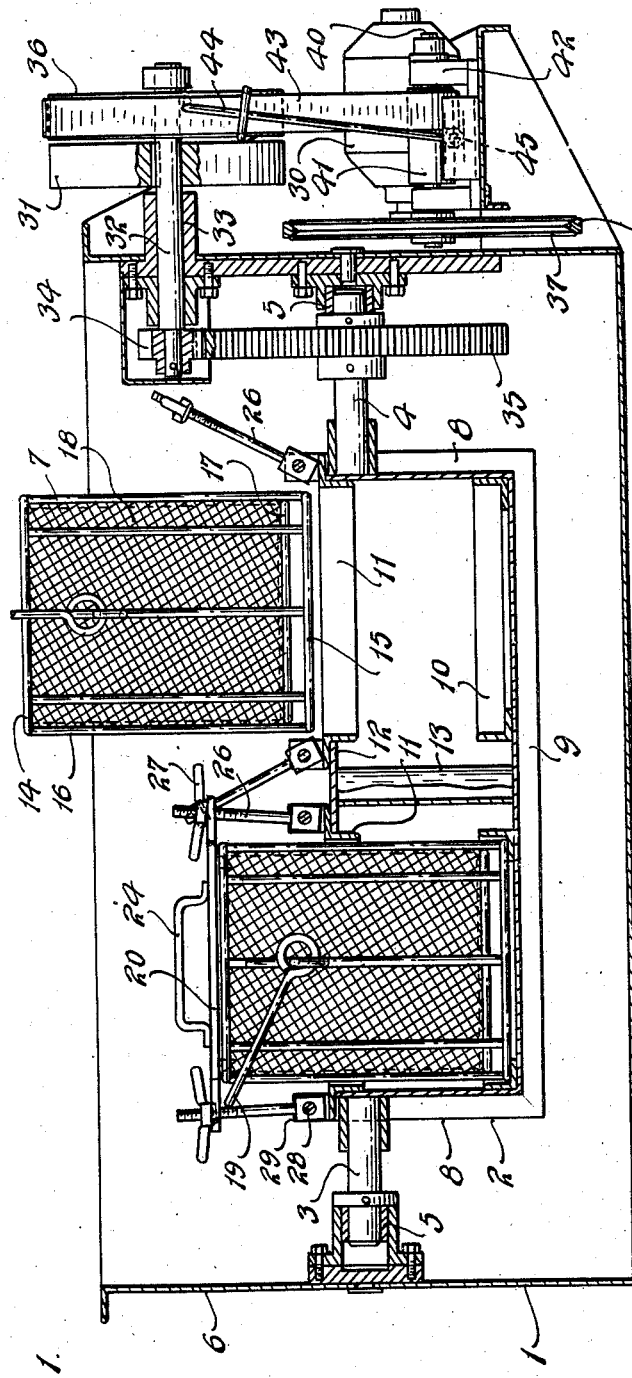
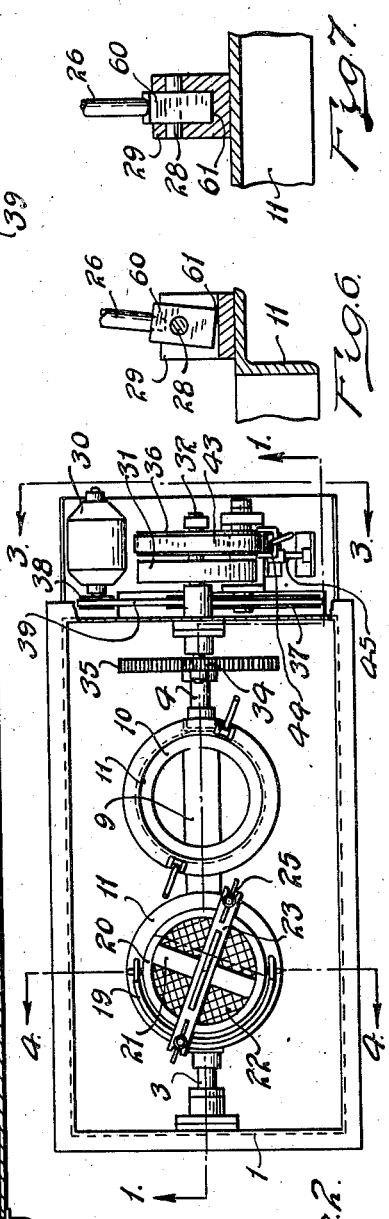
INVENTOR.
KARL G. SODERBERG.
BY
Barnes, Kisselle, Laughlin & Raisch
ATTORNEYS April 29, 1941.   K. G. SODERBERG   2,239,904
TUMBLING MACHINE
Filed March 23, 1940   2 Sheets-Sheet 2

INVENTOR.
KARL G. SODERBERG.
BY
Barnes, Kisselle, Laughlin & Raisch
ATTORNEYS

Patented Apr. 29, 1941

2,239,904

UNITED STATES PATENT OFFICE 2,239,904

TUMBLING MACHINE

Karl Gustaf Soderberg, Detroit, Mich., assignor to The Udylite Corporation, Detroit, Mich., a corporation of Delaware Application March 23, 1940, Serial No. 325,619

3 Claims. (Cl. 141—1)

This invention relates to a tumbling machine and more particularly to a machine for tumbling work in bulk in a solution for cleaning, rinsing, pickling, phosphatizing, chromatizing, or otherwise chemically treating the work.

It is the object of this invention to produce a machine in which work in bulk, particularly small articles or parts, can be easily and economically handled and with a minimum dragout of the solution.

This invention also contemplates a machine in which articles in bulk are subjected to immersion treatment with strong agitation of the liquid. Because of this strong agitation any treatment of the work is very effective and the time required to effectively treat the work is much less than in other machines heretofore used.

Another object of the invention is to produce a machine which requires small space per unit volume of production.

These objects are achieved by a machine which in general comprises a rotating cradle and a removable basket in which the work is tumbled in the solution. The work is retained in the basket for treatment in other solutions before and/or after the tumbling.

In the drawings:

Fig. 1 is a vertical longitudinal section through the machine along the line 1—1 of Fig. 2, showing one of the baskets being removed from the cradle.

Fig. 2 is a plan view of the machine.

Figs. 6 and 7 show details of the means for locking the cover on the basket and locking the basket in the cradle.

Figure 3:
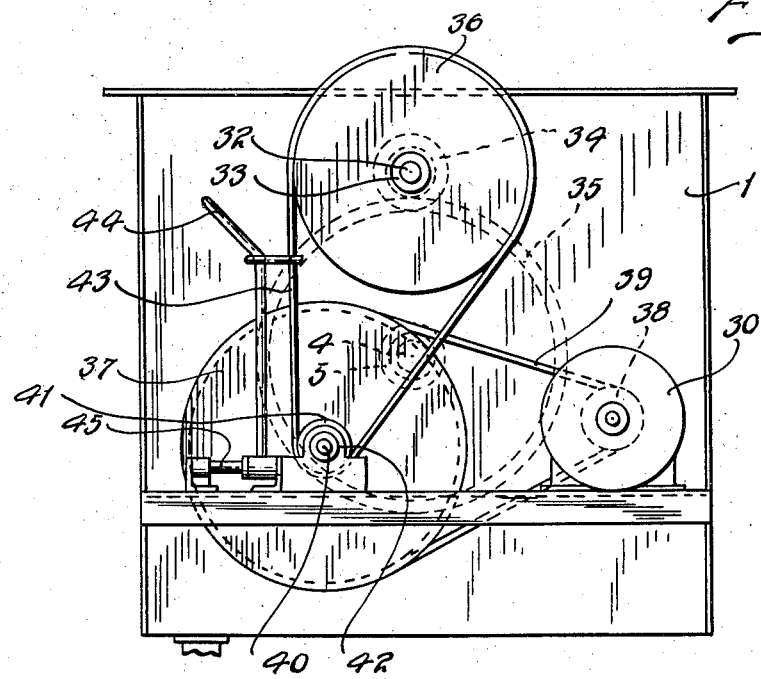
Fig. 3 is an elevational view along the line 3—3 of Fig. 2.
Figure 4:
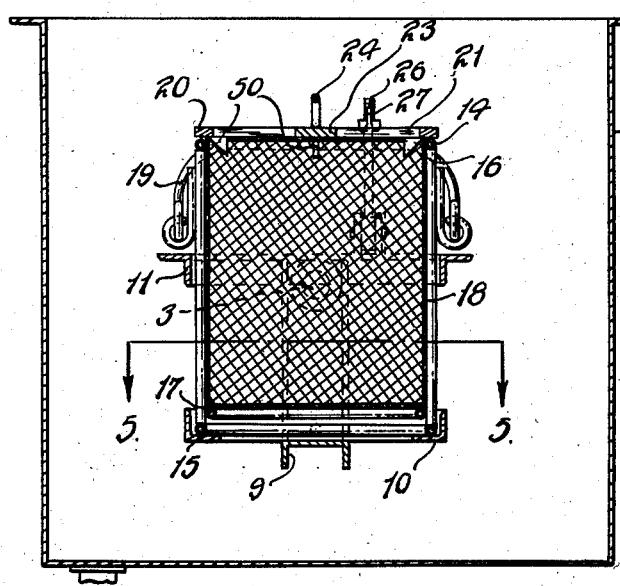
Fig. 4 is a sectional view along the line 4—4 of Fig. 2.
Figure 5:
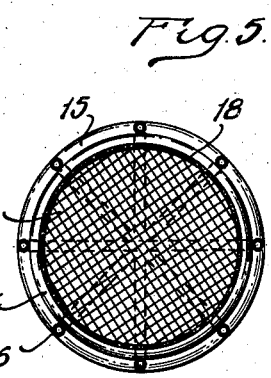
Fig. 5 is a section along the line 5—5 of Fig. 4.

Referring more particularly to the drawings, the machine comprises a tank 1 for the solution and a cradle 2 mounted upon longitudinal aligned shafts 3 and 4 which are journalled in bearing supports 5 fixed to the end walls 6 of the tank. The cradle 2 herein shown is a double cradle for carrying two baskets 7. It is, of course, understood that the cradle will work equally as well with a single basket as with two and can be constructed to accommodate a plurality of baskets.

The cradle comprises a U shaped frame of end members 8 and a bottom member 9 preferably of U channel sections. For holding each basket 7 in the frame there is provided a lower ring 10 and an upper ring 11 preferably made of angle iron. The ring members preferably have a peripheral contour such as circular or polygonal, corresponding to the peripheral contour of the basket 7. The lower ring 10 is welded or otherwise fixed to the bottom frame member 9 and the upper ring member 11 is welded at one end to the upright frame member 8 and at the other end to a plate 12 welded or otherwise fixed upon an iron pipe support member 13, the lower end of which is welded or otherwise secured to the frame member 9 at its mid-section.

The basket 7 consists of top and bottom frame members 14 and 15, respectively, which are either circular or polygonal in contour. The top and bottom frame members are connected by a plurality of upright rods 16 welded or otherwise secured to the members 14 and 15. Frame member 15 serves primarily as a handle for dumping the basket when removed from the cradle. Mounted within the rods 16 and spaced above the bottom frame member 15 is another circular ring member 17. The wall 18 of the basket 7 is foraminated and can consist of any suitable material such as a wire mesh of Monel or other metal or metallic alloy. The wire mesh 18 extends across the ring 17 so that it serves not only as the bottom but also as the side walls of the basket 7. The wire mesh 18 can be welded or otherwise secured to the framework 14, 16, 17 of the basket. The basket is provided with a bail 19 pivotally secured to diametrically opposed rods 16.

The basket is provided with a cover consisting of a ring member 20 bridged by cross members 21 and 23 and covered with wire mesh 22 of the same type as the side and bottom walls of the basket. A handle 24 is mounted on cross member 23. The ends of cross member 23 extend beyond the periphery of ring 20 and are bifurcated as at 25, Fig. 2, to receive at each end a bolt member 26 provided with a wing nut 27 for locking the cover on to the basket and for locking the basket in the cradle. Each bolt 26 is supported on pin 28 carried by the bracket 29 welded on the upper ring member 11. The lower end 60 of the bolt 26 is made with a rectangular cross section which serves as a stop to limit the pivoting of the bolt 26 through a small arc. The lower corners 61 of the bolt abut the bottom of the bracket 29 as the bolt is swung to the right or to the left to positively limit the pivoting of the bolt and thus preventing the same from swinging downwardly into the solution or into a position where it will interfere with the placing of the baskets into the cradle or their removal therefrom.

The cradle is rotated about shafts 3 and 4 by a drive consisting of an electric motor 30, driving pulley 31 fixed on shaft 32 journalled in bearing 33 mounted in the end wall of the tank, and a gear 34 fixed on the other end of shaft 32 which meshes with large gear 35 fixed on shaft 4. An idling pulley 36 is mounted on the end of shaft 32. A V pulley 37 is connected to the motor pulley 38 by a V belt 39. The V pulley 37 is fixed on shaft 40. Pulley 41 is also fixed on shaft 40 rotatably supported in bearings 42. A driving belt 43 optionally connects pulley 31 or 36 with pulley 41. When the bolt is shifted on to idler pulley 36, the cradle quite frequently fails to stop with the top of the baskets uppermost. Upon such occasions the driving pulley 31 is useful for turning the cradle to the proper position with the top of the baskets uppermost for removal of the baskets. A shifting lever 44, pivoted as at 45, can be swung to the left, Fig. 1, to shift the belt 43 on to pulley 31 and thus through the train of gears outlined above, rotate the cradle 2 and baskets 7 which tumbles the work in the solution.

Where the machine is used for alkaline cleaning of metal parts in a hot solution of an alkaline cleaner, the tank, cradle and baskets can be made from steel. If the work is to be tumbled in an acid pickling solution, then the basket, cradle, tank, and other parts which come in contact with the acid solution will be either rubber coated or made from an acid resisting material. The material from which the machine is made depends on the immersion process for which it is used. Other suitable materials will be used when the machine is used for other processes.

In operation the baskets 7 are locked in the cradle by the locking mechanism 26, 27 and the baskets thus rotated about a horizontal axis on shafts 3 and 4. The baskets are covered during the tumbling and the same means that are used for fastening the cover on the basket also lock the basket in the cradle. The cover 20 is provided with a plurality of V members 50 positioned in spaced relation about every forty-five degrees about the periphery of the cover. These V members 50 reinforce the top 14 of the basket and retains its shape during the tumbling. The V members 50 guide the cover into proper closing position as one tightens down on the nuts 27. When the work has been thoroughly tumbled in the solution, the lock members 26, 27 are released and the basket 7 easily lifted out of the cradle by bail 19.

I claim:

1. A machine for tumbling articles in the presence of a liquid comprising in combination a tank adapted to hold a liquid chemical, a U shaped frame rotatably mounted within said tank for rotation about a substantially horizontal axis, a plurality of ring members mounted in spaced relation one above the other on said U shaped frame, a foraminated basket adapted to be received within said ring members, a removable cover for said basket, and a swingable fastening means for securing the cover on the basket and for securing the basket within the ring members whereby the work within the basket is tumbled as the U shaped frame is rotated.

2. A machine for tumbling articles in the presence of a liquid comprising in combination a tank, a U shaped frame rotatably mounted within said tank and adapted to constitute a cradle, a foraminated basket comprising top and bottom frame members, a plurality of upright rods connecting said frame members, a cover, a base and foraminated walls, rings fitted in said U shaped frame constituting a container for said basket, and fastening means to hold said basket in place and power means to rotate said cradle and basket in said tank.

3. A machine for tumbling articles in the presence of a liquid comprising in combination a tank for holding a liquid chemical, a cradle comprising a U frame and a plurality of rings mounted in spaced relation one above the other on the U frame and cooperating with said frame to support the below-mentioned basket, a pair of shafts rotatably supporting the U frame at each end, a perforate basket for receiving the work adapted to removably fit in said rings, a removable cover for said basket, and pivoted locking means for locking the basket in the cradle whereby upon rotation of the cradle the work is tumbled in said basket.

KARL GUSTAF SODERBERG.